United States Patent [19]
Lawless et al.

[11] Patent Number: 5,224,828
[45] Date of Patent: Jul. 6, 1993

[54] PALLET BRAKE TRACK ASSEMBLY

[75] Inventors: Robert J. Lawless, Marietta; Brian J. Hudock, Atlanta; Samuel N. Bacon, III, Smyrna, all of Ga.

[73] Assignee: Creative Storage Systems, Inc., Marietta, Ga.

[21] Appl. No.: 761,422

[22] Filed: Sep. 17, 1991

[51] Int. Cl.$^5$ .............................................. B65G 13/00
[52] U.S. Cl. ..................................... 193/35 A; 414/536
[58] Field of Search .............. 193/35 A; 414/276, 536

[56] References Cited

U.S. PATENT DOCUMENTS

| | | | |
|---|---|---|---|
| 2,738,103 | 3/1956 | Bisese | 193/35 A X |
| 3,245,510 | 4/1966 | Cowan | 193/35 A |
| 3,368,658 | 2/1968 | Eastham | 193/35 A |
| 3,473,642 | 10/1969 | Lorden et al. | 193/35 A |
| 4,185,729 | 1/1980 | Obermeyer | 193/35 A |
| 4,219,115 | 8/1980 | Moore | 193/35 A X |
| 4,715,765 | 12/1987 | Agnoff | 414/276 |

FOREIGN PATENT DOCUMENTS 2245952  3/1973  Fed. Rep. of Germany ... 193/35 A

OTHER PUBLICATIONS

Interroll Logix 2000 Brochure.
"Gravity Flow Storage Ensures First-In, First-Out Handling", from *Prepared Foods*, Sep. 1986.

*Primary Examiner*—Joseph E. Valenza
*Assistant Examiner*—Tuan N. Nguyen
*Attorney, Agent, or Firm*—Louis T. Isaf

[57] ABSTRACT

A pallet brake track assembly for use in an inclined pallet flow system to maintain slow movement of descending loaded pallets and including, in its most preferred embodiment, first and second frame members extending in parallel to form an extended inner channel, a plurality of inner axles transversely connected between the first and second frame members and located within the extended inner channel, a plurality of inner wheels rotatably mounted on the plurality of inner axles, a plurality of inner cylindrical spacers with axial slits for snap-on assembly coaxially connected around the plurality of inner axles, a brake apparatus located at least partially within the extended inner channel and including a support assembly connected to the first and second frame members and a cylindrical brake drum with a rubber contact surface rotatably connected to the support assembly, a plurality of outer axles connected to at least one of the first and second frame members adjacent to the brake apparatus, each of the outer axles extending outward and away from the extended inner channel, and a plurality of outer wheels rotatably mounted on the plurality of outer axles at locations outside the extended inner channel. The brake drum is biased to extend above the other wheels to provide an improved braking ability. The pluralities of inner and outer wheels are arranged to maximize flow availability and to minimize damage to both the brake apparatus and the loaded goods.

39 Claims, 6 Drawing Sheets

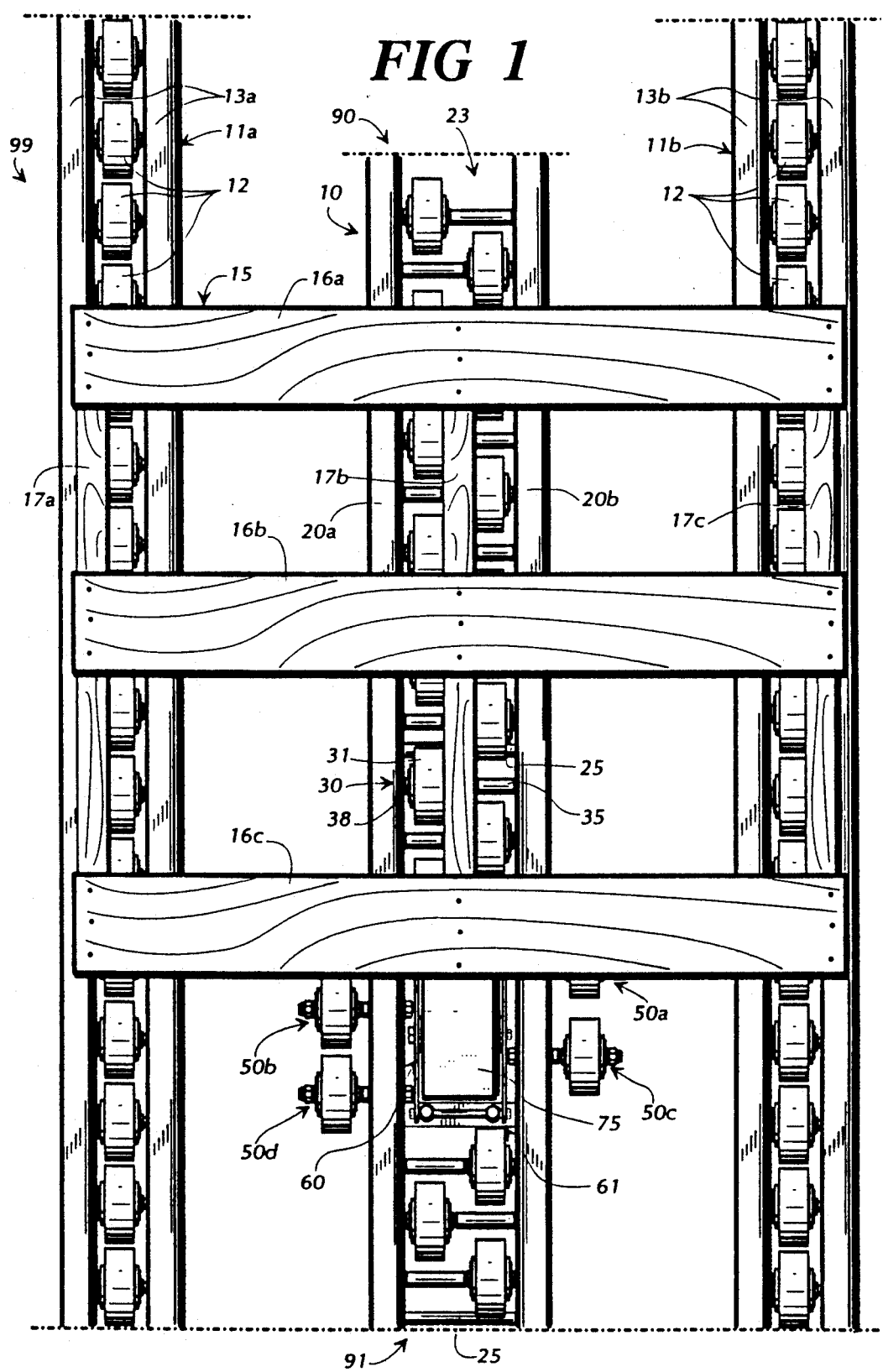

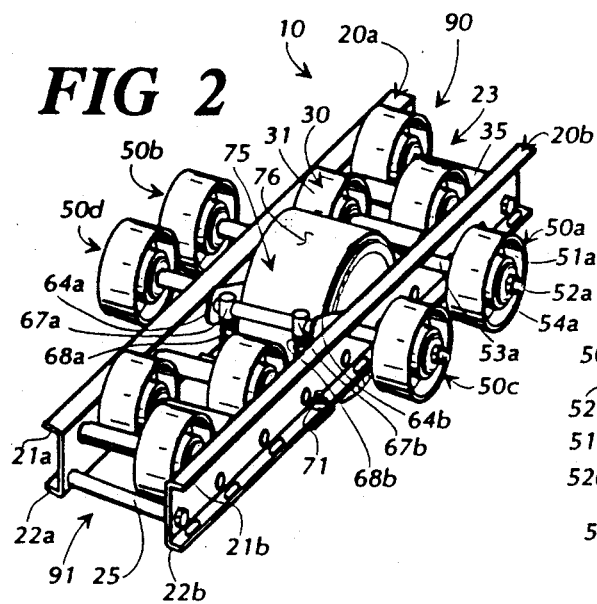
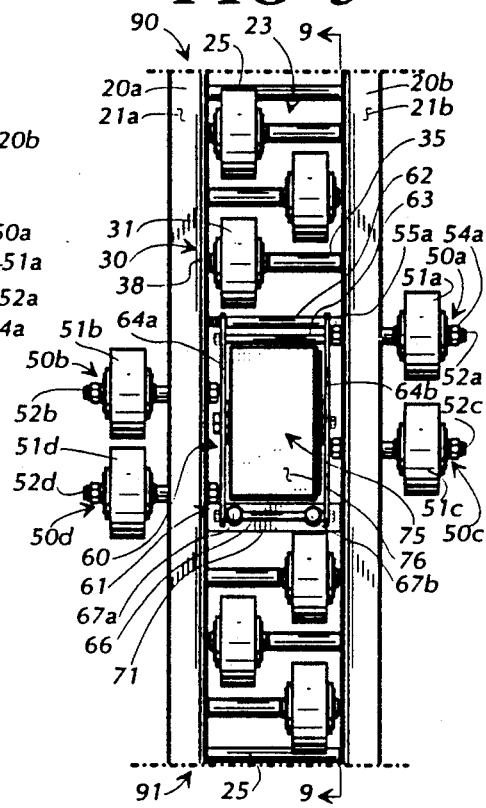
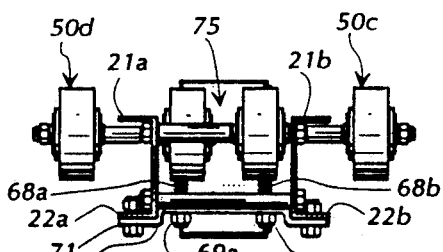

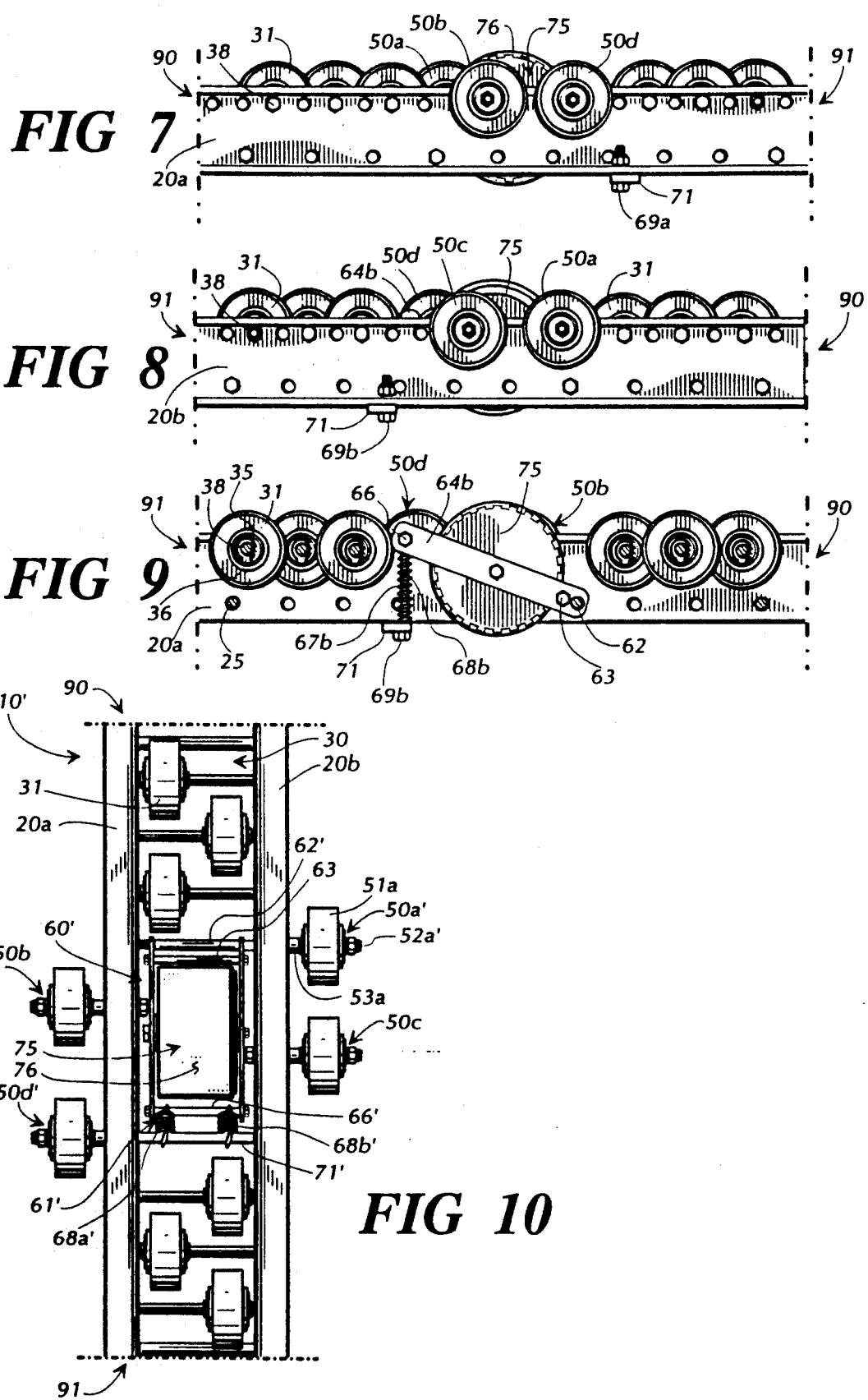

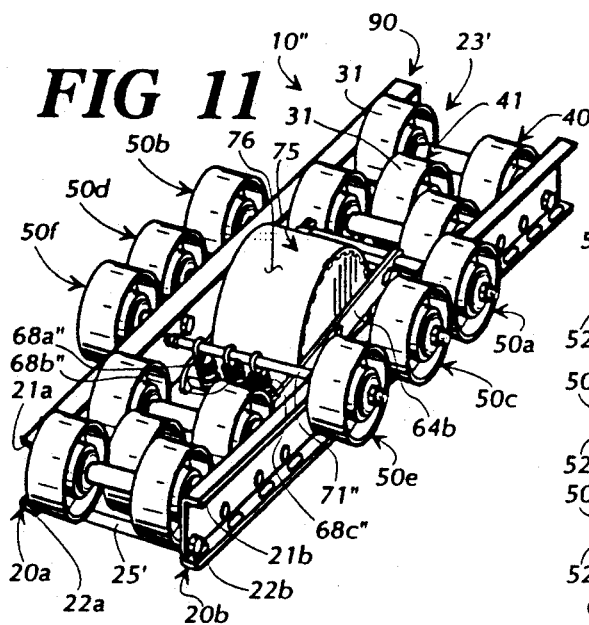
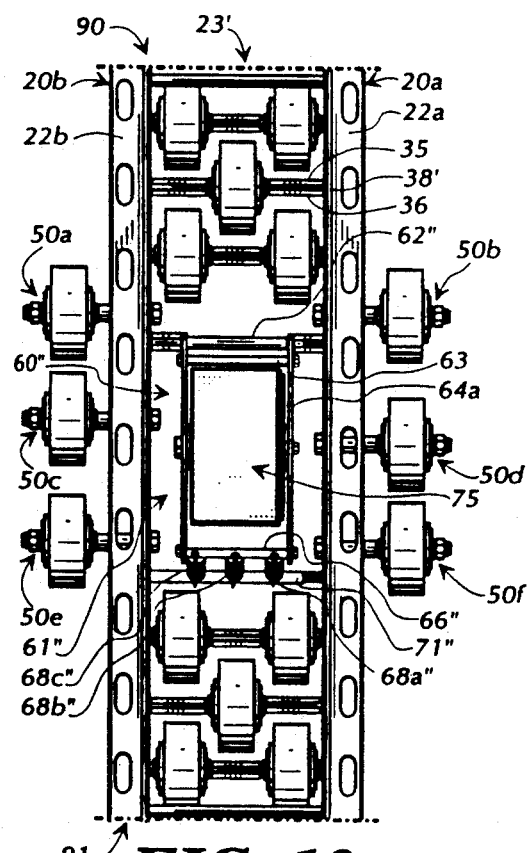
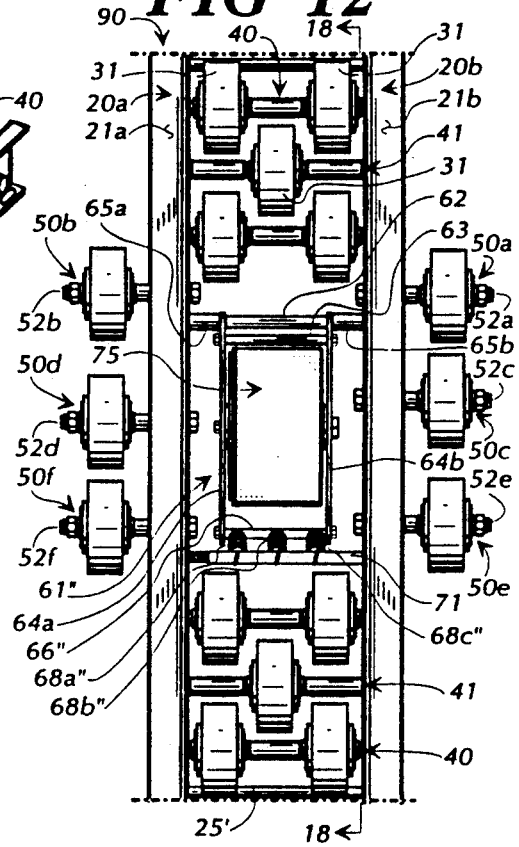
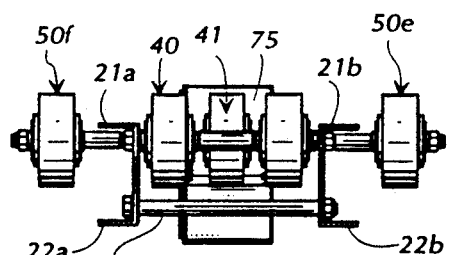
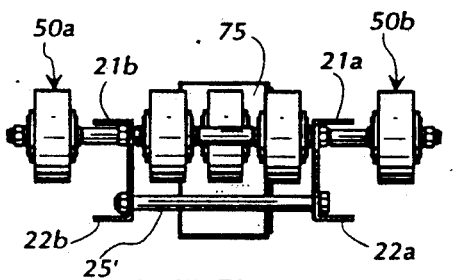

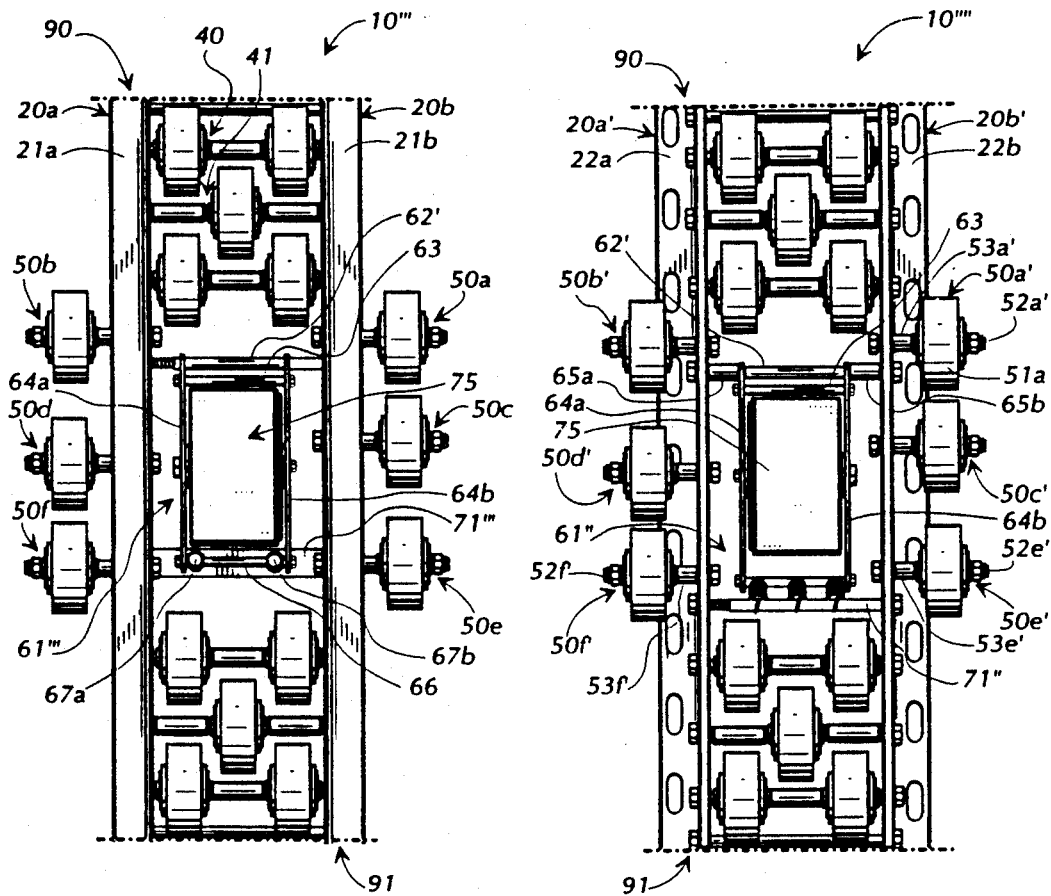
FIG 19          FIG 20
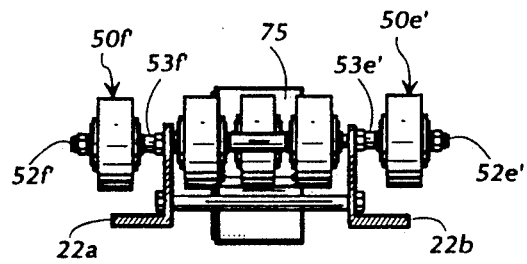
FIG 21

PALLET BRAKE TRACK ASSEMBLY

BACKGROUND OF THE INVENTION

The present invention relates generally to the field of pallet flow systems and, in its most preferred embodiments, to the field of pallet brake track assemblies.

Wooden pallets are often used during transportation and storage of a large variety of different goods. Although these pallets exist in many different sizes and shapes, many pallets include three or more bottom boards which are separated from three or more top boards by three or more perpendicularly extending support boards, commonly referred to as stringers. After loaded pallets arrive at their final destination, the goods are unloaded from the pallets. Pallet flow systems have existed for many years and have provided relatively organized and efficient methods for removing goods from pallets.

Pallet flow systems commonly include at least one track assembly including wheels and/or rollers supported in an inclined orientation by a strong support structure. The top of the pallet flow system is the loading end, and the bottom of the pallet flow system is the unloading end. During use of a typical pallet flow system, a worker, often with the aid of a fork-lift, places a loaded pallet onto the upper end of the pallet flow system. The loaded pallet, typically along with other loaded pallets, then, due to gravity, flows down the inclined pallet flow system until it reaches the lower unloading end. After the goods are unloaded from the pallet, the empty pallet is removed from the pallet flow system so that the next loaded pallet may flow down to the bottom of the incline. In other environments, the entire loaded pallet is removed from the lower unloading end of the pallet flow system.

During periods of time when pallet flow systems are idle, such as during off-shifts and/or during the night, loaded pallets remain stationary. When heavier loaded pallets rest for prolonged periods of time on many of the previously developed types of pallet flow systems, the wooden bottom boards of the pallets frequently deform around the wheels of the pallet flow systems. After the wheels become even slightly embedded into the wooden bottom boards, it is relatively difficult, and often potentially dangerous, for a worker to re-start the flow.

Large pallet flow systems are also often relatively long and involve significant overall vertical drops. To slow the descent of loaded pallets, which would otherwise accelerate uncontrollably, various types of pallet brake track assemblies have been developed. These pallet brake track assemblies often include similar wheels, or rollers, and further include brake apparatuses connected to the track assemblies. One problem experienced by some of the previously developed pallet brake track assemblies relates to their ability to slow various types of loaded pallets. Very heavy loaded pallets or loaded pallets with warped bottom boards or few bottom boards often flow down these brake track assemblies with little or no restrictions on their velocities.

Another problem experienced by some of the previously developed pallet brake track assemblies relates to the transition between the freely rotating wheels, or rollers, and the brake apparatuses. One type of brake apparatus includes a brake drum located in line with the freely rotating wheels of the pallet brake track assembly. Because the brake drum is often larger than the wheels, the transition between the wheels and the brake drum typically involves a gap in support which allows the pallet bottom boards to deflect or fall downward before reaching the brake drum. In some cases, a loaded pallet becomes stuck on the brake drum, thus interrupting the flow of the pallet flow system. In other cases, the pallet bottom boards collide with and wear or damage the brake drum and/or drum support members. Furthermore, these collisions are often abrupt and damage the goods loaded on the pallet. Finally, the collisions also can tend to undesirably alter the orientations of the pallets.

There is a need, therefore, to provide a pallet brake track assembly which solves these and other related and unrelated problems.

SUMMARY OF THE INVENTION

Briefly described, the present invention, in its most preferred embodiment, includes a pallet brake track assembly for use in an inclined pallet flow system to maintain slow movement of descending loaded pallets. Included in the preferred embodiment of the present invention are first and second frame members extending in parallel to form an extended inner channel, a plurality of inner axles transversely connected between the first and second frame members and located within the extended inner channel, a plurality of inner wheels rotatably mounted on the plurality of inner axles, a plurality of inner cylindrical spacers with axial slits for snap-on assembly coaxially connected around the plurality of inner axles, a brake apparatus located at least partially within the extended inner channel and including a support assembly connected to the first and second frame members and a cylindrical brake drum with a rubber contact surface rotatably connected to the support assembly, a plurality of outer axles connected to at least one of the first and second frame members adjacent to the brake apparatus, each of the outer axles extending outward and away from the extended inner channel, and a plurality of outer wheels rotatably mounted on the plurality of outer axles at locations outside the extended inner channel.

Relative to the first and second frame members, the rubber-surfaced brake drum is biased by the support assembly to extend slightly above the other wheels connected to the first and second frame members, thereby providing improved braking abilities. The pluralities of inner and outer wheels are arranged to maximize flow availability, minimize damage to both the brake apparatus and the loaded goods, and maintain proper pallet orientation.

It is therefore an object of the present invention to provide a pallet brake track assembly which maximizes flow availability through a unique arrangement of wheels.

Another object of the present invention is to provide a pallet brake track assembly which includes wheels arranged to ensure that a pallet bottom board of a descending pallet is continuously in contact with at least three wheels of the pallet brake track assembly.

Yet another object of the present invention is to provide a pallet brake track assembly which minimizes damage to both a brake apparatus and goods loaded on a descending pallet and maintains proper pallet orientation.

Still another object of the present invention is to provide a pallet brake track assembly which includes an extended inner channel, brake apparatus located at least partially within the extended inner channel, and wheels mounted adjacent to the brake apparatus and located outside the extended inner channel.

Still another object of the present invention is to provide a pallet brake track assembly which includes a plurality of freely rotating wheels and a brake drum biased to extend above the freely rotating wheels to provide improved braking abilities.

BRIEF DESCRIPTION OF THE DRAWINGS

FIG. 1 is a top view of a cut-way portion of a Pallet Brake Track Assembly in accordance with the preferred embodiment of the present invention, shown extending between two cut-away pallet side track assemblies and underneath a pallet.

FIG. 2 is a perspective view of a cut-away portion of the pallet brake track assembly of FIG. 1.

FIG. 3 is a top view of the pallet brake track assembly of FIG. 2.

FIG. 4 is a bottom view of the pallet brake track assembly of FIG. 2.

FIG. 5 is a front end view of the pallet brake track assembly of FIG. 2.

FIG. 6 is a rear end view of the pallet brake track assembly of FIG. 2.

FIG. 7 is a left side view of the pallet brake track assembly of FIG. 2.

FIG. 8 is a right side view of the pallet brake track assembly of FIG. 2.

FIG. 9 is a cross-sectional view taken along the line 9—9 of FIG. 3.

FIG. 10 is a top view of a pallet brake track assembly in accordance with an alternate embodiment of the present invention including a suspension assembly.

FIG. 11 is a perspective view of a pallet brake track assembly in accordance with another alternate embodiment of the present invention including an increased number of wheels.

FIG. 12 is a top view of the pallet brake track assembly of FIG. 11.

FIG. 13 is a bottom view of the pallet brake track assembly of FIG. 11.

FIG. 14 is a front end view of the pallet brake track assembly of FIG. 11.

FIG. 15 is a rear end view of the pallet brake track assembly of FIG. 11.

FIG. 19 is a top view of a pallet brake track assembly in accordance with another alternate embodiment of the present invention including a compression-type brake support assembly.

FIG. 20 is a top view of a pallet brake track assembly in accordance with another alternate embodiment of the present invention including alternately shaped frame members.

FIG. 21 is a front end view of the pallet brake track assembly of FIG. 20.

DETAILED DESCRIPTION OF THE PREFERRED EMBODIMENT

Figure 16:
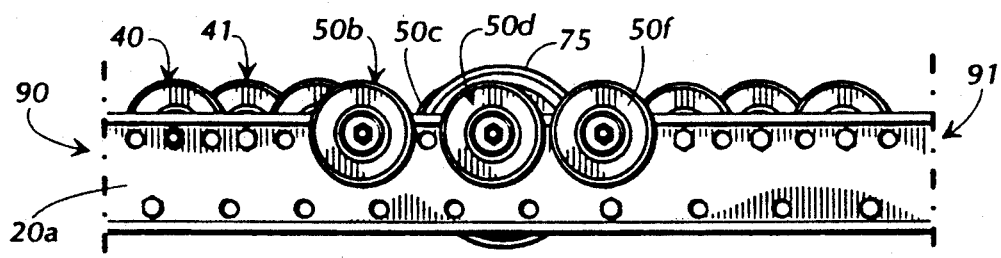
FIG. 16 is a left side view of the pallet brake track assembly of FIG. 11.
Figure 17:
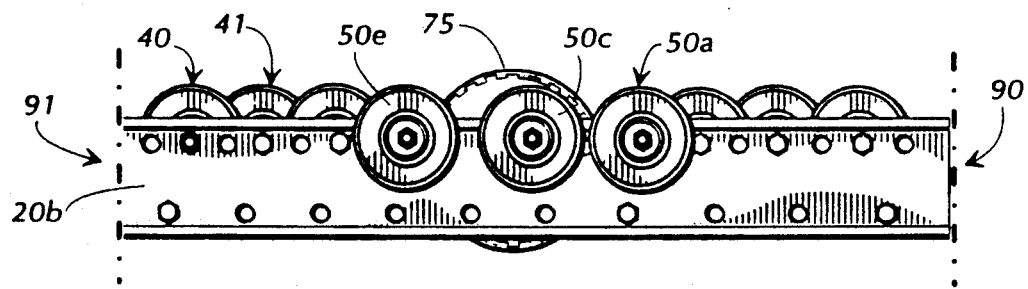
FIG. 17 is a right side view of the pallet brake track assembly of FIG. 11.

Referring now in greater detail to the drawings, in which like numerals represent like components throughout the several views, FIGS. 1-9 show cut-away representations of a Pallet Brake Track Assembly 10 in accordance with the preferred embodiment of the present invention. FIG. 1 shows cut-away views of the pallet brake track assembly 10 and two pallet side track assemblies 11a, 11b of a pallet flow system 99. A pallet 15 is also shown supported by the tracks 10, 11a, 11b of the pallet flow system 99. The pallet brake track assembly 10 and the pallet side track assemblies 11a, 11b are connected together and supported in an inclined orientation by an underlying strong support structure (not shown). The pallet side track assemblies 11a, 11b include side track frames 13a, 13b, which are supported by the underlying strong support structure, and side track wheels 12, which are connected to the side track frames 13a, 13b. The wooden pallet 15 is representative of one type of common pallet and includes three transversely extending pallet top boards 16a, 16b, 16c, three longitudinally extending pallet stringers 17a, 17b, 17c, and three transversely extending pallet bottom boards, hidden from view by the pallet top boards 16a, 16b, 16c. The pallet top boards 16a, 16b, 16c are connected to the pallet stringers 17a, 17b, 17c, which are connected to the pallet bottom boards. The pallet bottom boards contact the pallet side track assemblies 11a, 11b and the pallet brake track assembly 10.

The pallet brake track assembly 10 of the preferred embodiment of the present invention includes two longitudinally extending frame members 20a, 20b. The frame members 20a, 20b, also referred to herein as left frame member 20a and right frame member 20b, extend between an assembly rear end 90 and an assembly front end 91 to form an inner channel 23. When supported in an inclined orientation by the underlying strong support structure, the assembly rear end 90 serves as the loading end and is located higher than the assembly front end 91, which serves as the unloading end. Transverse frame supports 25 extend transversely between the frame members 20a, 20b.

Also extending transversely between the frame members 20a, 20b, and located partially within the inner channel 23, are alternating inner wheel assemblies 30. Included within each alternating inner wheel assembly 30 is an inner axle 38 connected between the frame members 20a, 20b, an inner wheel 31 rotatably mounted on the inner axle 38, and an inner spacer 35 coaxially mounted on the inner axle 38 to maintain the transverse position of the inner wheel 31. In the preferred embodiment of the present invention, the inner wheels 31 and inner spacers 35 are so arranged that the inner wheels 31 alternate from inner axle 38 to successive inner axle 38 between being located adjacent to the left frame member 20a and the right frame member 20b, as is shown in FIG. 1.

In addition, a brake apparatus 60, which includes a brake support assembly 61 supporting a cylindrical brake drum 75, is connected to the frame members 20a, 20b and located partially within the inner channel 23. In the preferred embodiment, the inner wheels 31 are equivalent in size and define a common wheel diameter. Furthermore, with the exception of the space occupied by the brake apparatus 60, the distance between each inner axle 38 is less than the common wheel diameter. Located adjacent to the brake apparatus 60 and extending outward and away from the inner channel 23 are outer wheel assemblies 50a, 50b, 50c, 50d, which are connected to the frame members 20a, 20b.

FIGS. 2-8 are perspective, top, bottom, front end, rear end, left side, and right side views, respectively, of a cut-away portion of the pallet brake track assembly 10 of the preferred embodiment of the present invention. Frame members 20a, 20b include upper legs 21a, 21b and lower legs 22a, 22b, thus the frame members 20a, 20b form "C"-shaped cross-sectional profiles.

The outer wheel assemblies 50a, 50b, 50c, 50d are identical and are thus described in terms of the first outer wheel assembly 50a. An outer axle 52a with an outer axle head 55a extends perpendicularly outward from a connection with the frame member 20b. An outer wheel 51a, having a diameter which is equivalent to the 30 diameters of the inner wheels 31, and an outer spacer 53a are securely mounted onto the outer axle 52a by an outer axle nut 54a. The outer wheel 51a is located transversely past the upper and lower legs 21b, 22b of the frame member 20b. In the preferred embodiment of the present invention, the outer wheel assemblies 50a, 50b, 50c, 50d are located at successively greater distances from the assembly rear end 90. Furthermore, the longitudinal distances between the first outer axle 52a and the nearest inner axle 38, between the first outer axle 52a and the second outer axle 52b, between the second outer axle 52b and the third outer axle 52c, and between the third outer axle 52c and the fourth outer axle 52d are less than the common wheel diameter.

The brake apparatus 60 includes the brake support assembly 61 and the brake drum 75. In the preferred embodiment of the present invention, the brake support assembly 61 is a compression-type brake support assembly 61. Among the numerous elements of the brake support assembly 61 are a rear support rod 62 which extends transversely between rigid connections with the frame members 20a, 20b, two mounting plates 64a, 64b which are pivotally connected at rear ends to the rear support rod 62 and extend longitudinally frontward along opposite sides of the inner channel 23, a rear connecting rod 63 transversely connected between the rear ends of the mounting plates 64a, 64b, a front connecting rod 66 transversely connected between front ends of the mounting plates 64a, 64b.

Two spring rods 67a, 67b are pivotally mounted on the front connecting rod 66 and extend downward, relative to the frame members 20a, 20b, to connections with a front support member 71 which is transversely connected between the frame members 20a, 20b. Two springs 68a, 68b are connected around the spring rods 67a, 67b above the front support member 71, and two spring rod nuts 69a, 69b are connected to the spring rods 67a, 67b below the front support member 71. The brake drum 75, including a rubber contact surface 76, is rotatably connected between the mounting plates 64a, 64b, and is located between the rear connecting rod 63 and the front connecting rod 66.

Each inner spacer 35 includes an axially extending spacer slit 36, as is shown in FIG. 4. FIG. 9 is cross-sectional view taken along line 9—9 of FIG. 3, and shows cross-sections of the inner axles 38 and the inner spacers 35 with spacer slits 36. The spacer slits 36 provide the inner spacers 35 with a snap-on ability, thereby simplifying the task of changing the transverse positions of the inner wheels 31. Also, the mounting plate 64b extends angled upward from the rear support rod 62, seen in cross-section, to the front connecting rod 66, which is located over the front support member 71. In addition, the brake drum 75 is seen extending slightly above the inner wheels 31 and the outer wheels 51.

With reference to FIGS. 1-9, the pallet brake track assembly 10 of the preferred embodiment of the present invention is supported in an inclined orientation, along with two pallet side track assemblies 11a, 11b, by an underlying strong support structure (not shown). It should be understood that the ends of the track assemblies 10, 11a, 11b, extend past the dotted lines indicated in the drawings, as required by the varying needs of different environments. Regardless of the overall length, the lengths of side track assemblies 11a, 11b, are equivalent to the length of the pallet brake track assembly 10. Multiple brake apparatuses 60 are spaced throughout the pallet brake track assembly 10, and the location of each brake apparatus 60 is determined by the weights and sizes of the pallets 15.

In operation of the preferred embodiment of the present invention, the pallets 15 are typically placed onto the upper end of the pallet flow system 99 by a worker with the aid of a fork-lift. It is, of course, understood that other methods of placing the pallets 15 onto the upper end of the pallet flow system 99, such as those involving cranes, rope/pulley combinations, and conveyor systems, are within the scope of the present invention. When the pallets 15 are placed onto the upper end of the pallet flow system 99, each pallet 15, under the influence of gravity, begins to descend down the pallet flow system 99. In the preferred embodiment of the present invention, the pallet side track assemblies 11a, 11b aid in balancing and supporting the pallets 15.

In the preferred embodiment of the present invention, as each pallet 15 flows down the pallet brake track assembly 10, each bottom board of the pallet 15 is continuously in contact with at least three wheels of the alternating inner wheel assemblies 30 and/or the outer wheel assemblies 50 due to appropriate sizing and arrangement. As a result, deformation of the bottom boards of the pallets 15 around the wheels 31, 51 is resisted; therefore, flow availability is enhanced.

As each pallet 15 reaches the brake apparatus 60, the first outer wheel 50a provides support to the bottom boards of the pallet 15 between the nearest inner wheel 31 and the brake drum 76. Subsequently, as the board leaves the brake drum 75, the fourth outside wheel 50d provide support to the board between the brake drum 75 and the next inner wheel 31. As a result, deflection and dropping down of the bottom boards of the pallet 15 are resisted both before and after the brake drum 75.

As a bottom board of a pallet 15 reaches the brake drum 75, the rubber contact surface 76 resists sliding between the board and the brake drum 75. In addition, because the brake drum 75 extends slightly above the wheels 31, 51, the brake drum 76 is more able to slow warped and uneven pallet bottom boards as the pallet 15 flows across the brake apparatus 60.

In the preferred embodiment of the present invention, as the bottom board of a pallet flows over the brake drum 75, the brake drum 75 is forced downward, with respect to the frame members 20a, 20b. As the brake drum 75 moves downward, the mounting plates 64a, 64b pivot about the rear support rod 62 to move the spring rods 67a, 67b downward through the front support member 71, thereby compressing the springs 68a, 68b which help maintain contact between the brake drum 75 and the bottom board of the pallet 15. Because the springs 68a, 68b compress as the brake drum 75 moves downward, the brake support assembly 61 of the preferred embodiment is referred to herein as a compression-type brake support assembly 61. Springs 68 are appropriately sized for the weights of the particular loaded pallets 15 used with each pallet flow system 99. The springs 68 are easily changed out in conjunction with changes in pallet weights.

The brake drum 75 has internal gears (not shown) which enable the brake drum 75 to strongly resist rotational motion. An example of an acceptable brake drum 75 is available from Schulze-Berg of West Germany. As the bottom board leaves the brake drum 75, the springs force the brake drum upward to the original location slightly above the wheels 31, 51.

FIG. 10 is top view of a pallet brake track assembly 10' in accordance with an alternate embodiment of the present invention. With the exception of an alternate brake apparatus 60' and two alternate outer wheel assemblies 50a', 50d', this alternate pallet brake track assembly 10' is very similar to the pallet brake track assembly 10 of the preferred embodiment. Unlike the compression-type brake support assembly 61 of the preferred embodiment, the alternate brake support assembly 61' is a suspension-type brake support assembly 61'. The operation of this type of brake support assembly 61' is discussed in detail below with regard to a similar suspension-type brake support assembly 61" of FIGS. 11-18.

The two alternate outer wheel assemblies 50a', 50d' are relatively similar to the outer wheel assemblies 50a, 50d of the preferred embodiment. However, the outer axles 52a' and 52d' are coaxially connected to the rear support rod 62' and the front support member 71', respectively, as rigid, unitary constructions. An acceptable example of these constructions is a common bolt. In another alternate embodiment of the present invention, (not shown) the brake apparatus 60' of FIG. 10 is combined with the outer wheel assemblies 50a, 50b, 50c, and 50d of the preferred embodiment with no unitary support rod/outer axle structures.

Figure 18:
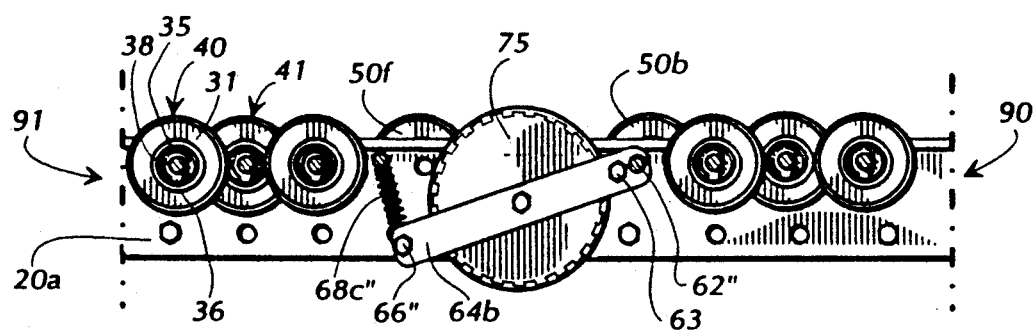
FIG. 18 is a cross-sectional view taken along the line 18—18 of FIG. 12.

FIGS. 11-17 are perspective, top, bottom, front end, rear end, left side, and right side views, respectively, of a pallet brake track assembly 10" in accordance with another alternate embodiment of the present invention. FIG. 18 is a cross-sectional view taken along 18—18 of FIG. 12. In this alternate embodiment, the frame members 20a, 20b are more separated than in the preferred embodiment of the present invention, thus forming a wide inner channel 23'. Consequently, the transverse frame supports 25' are longer than the transverse frame supports 25 of FIGS. 1-10.

The inner wheels 31 are generally arranged into alternating sets of double inner wheel assemblies 40 and center inner wheel assemblies 41, although double inner wheel assemblies 40 are adjacent to both front and rear ends of the brake apparatus 60". Each double inner wheel assembly 40 includes an inner axle 38' upon which two inner wheels 31 are mounted on either side of an inner spacer 35 so that an inner wheel 31 is adjacent to each of the frame members 20a, 20b. Each center inner wheel assembly 41 includes an axle 38' upon which an inner wheel 31 is positioned equidistant between the frame members 20a, 20b by two adjacent inner spacers 35. As with the preferred embodiment, the inner axles 38' are longitudinally displaced by distances which are less than the previously described common wheel diameter of the inner wheels 31. Furthermore, the inner spacers 35 also include the spacer slits 36, which provide for snap-on assembly.

Each of the outer wheel assemblies 50a-50f are similar to the outer wheel assemblies 50a-50d of the preferred embodiment of the present invention. As shown in the drawings, and unlike the preferred embodiment of the present invention, the outer wheel assemblies 50a-50f are not located at successively greater distances from the assembly rear end 90. The first and second outer axles 50a, 50b are located at the same distance from the assembly rear end 90. Similarly, the fifth and sixth outer axles 50e, 50f are located at the same distance from the assembly rear end 90. The longitudinal distances between the first outer axle 52a and the nearest inner axle 38' and between the third outer axle 52c and the fourth outer axle 52d are less than the common wheel diameter.

The braking apparatus 60" includes many elements which are similar to the braking apparatus 60 of the preferred embodiment of the present invention, including the brake drum 75, the mounting plates 64a, 64b, and the rear connecting rod 63. The rear support rod 62" is longer than the rear support rod 62 of the preferred embodiment, and two rear support spacers 65a, 65b are mounted on the rear support rod 62" to maintain the transverse positions of the mounting plates 64a, 64b. The mounting plates 64a, 64b are pivotally connected at rear ends to the rear support rod 62" and extend longitudinally along each side of the wide inner channel 23' to connections with a front connecting rod 66". The mounting plates 64a, 64b extend angled downward, with respect to the frame members 20, 20b, (as seen in FIG. 18) from connections with the rear connecting rod 62" In this alternate embodiment of the present invention, the front connecting rod 66" is attached to three springs 68a, 68b, 68c which suspend the front connecting rod 66" below a front support member 71" which extends transversely between the frame members 20a, 20b. In other alternate embodiments, various numbers of springs 68 are utilized, including the use of only one spring 68. The brake drum 75 is rotatably mounted between the mounted plates 64a, 64b and is located between the rear connecting rod 63 and the front connecting rod 66".

The operation of the pallet brake track assembly 10" in accordance with the alternate embodiment of the present invention disclosed in FIGS. 11-18 is relatively similar to the operation of the preferred embodiment of the present invention. This alternate embodiment is adapted to provide similar benefits to a pallet flow system which handles loaded pallets of much greater weights than those handled by the preferred embodiment. The arrangements of the wheels 31, 51 provide good flow availability and reduce damage to the brake apparatus 60" and the loaded qoods.

As pallet bottom boards contact the brake drum 75, which is maintained slightly above the wheel 31, 51, the brake drum 75 is moved downward, with respect to the frame members 20a, 20b. As the brake drum 75 moves downward, the mounting plates 64a, 64b pivot around the rear support rod 62" to further stretch the springs 68a-68c. As the pallet bottom boards disengage the brake drum 75, the springs 68a-68c urge the brake drum 75 back to the original orientation above the wheels 31, 51.

FIG. 19 is a top view of a pallet brake track assembly 10''' in accordance with another alternate embodiment of the present invention including a compression-type brake support assembly 61'''. With the exception of the brake support assembly 61''', this alternate embodiment is very similar to the alternate embodiment of FIGS. 11-18. The compression-type brake support assembly 61''' is very similar to the brake support assembly 60 of the preferred embodiment of the present invention. The principal differences include a longer rear support rod 62' and a longer front support member 71'''.

FIGS. 20 and 21 are top and front end views, respectively, of a pallet brake track assembly 10'''' in accordance with another alternate embodiment of the present invention including alternately shaped frame members 20a', 20b '. With the exceptions of alternately shaped frame members 20a', 20b' and shorter outer spacers 53a'-53f' and outer axles 52a'-52f', this alternate embodiment is very similar to the alternate embodiment of FIGS. 11-18.

Unlike the "C"-shaped cross-sectional profiles of all of the preceding frame members 20a, 20b, the frame members 20a', 20b' of this alternate embodiment of the present invention define "L-shaped" cross-sectional profiles, as is seen in FIG. 21. Only lower legs 22a, 22b extend transversely away from the inner channel 23'. Because their are no upper legs similar to the upper legs 21a, 21b of the embodiment of FIGS. 11-18 on the frame members 20a', 20b' of this alternate embodiment, shorter outer spacers 53a'-53f' and outer axles 52a'-52f' are utilized to move the outer wheels 51a-51f transversely nearer to the inner channel 23'. Because the outer wheels 51a, 51c, 51e are transversely closer to the outer wheels 51b, 51d, 51f, and all of the outer wheels 51a-51f are closer to their respective frame member 20a, 20b, the pallet brake track assembly 10'''' is better equipped for very heavy loads.

While the embodiments of the present invention which have been disclosed herein are the preferred forms, other embodiments of the method and apparatus of the present invention will suggest themselves to persons skilled in the art in view of this disclosure. Various other wheel, brake apparatus, or track assembly combinations are also considered to be within the scope of the present invention.

Therefore, it will be understood that variations and modifications can be effected within the spirit and scope of the invention and that the scope of the present invention should only be limited by the claims below. It is also understood that the relative dimensions and relationships shown on the drawings are given as the preferred relative dimensions and relationships, but the scope of the invention is not to be limited thereby.

I claim:

1. Pallet brake track assembly for use in an inclined pallet flow system to maintain slow movement of descending loaded pallets, said pallet brake track assembly having an assembly rear end which first encounters a descending loaded pallet and an assembly front end which last encounters the descending loaded pallet, said pallet brake track assembly comprising:

a first frame member extending longitudinally between an assembly rear end and an assembly front end;

a second frame member extending longitudinally between the assembly rear end and the assembly front end and extending parallel to said first frame member, thereby defining an extended inner channel between said first and second frame members;

a brake apparatus located at least partially within the extended inner channel;

a plurality of outer axles connected to at least one of said first frame member and said second frame member adjacent said brake apparatus, wherein each outer axle of said plurality of outer axles extends outward and away from the extended inner channel in cantilevered form; and a plurality of outer wheels rotatably mounted on said plurality of outer axles at locations outside the extended inner channel.

2. Assembly of claim 1, wherein each of said first and second frame members defines a relatively "C"-shaped cross-sectional profile with upper and lower legs extending transversely outward.

3. Assembly of claim 1, wherein said brake apparatus includes, at least, a rear support rod transversely connected between said first and second frame members, first and second mounting plates pivotally connected, at rear ends, to said rear support rod and extending longitudinally along opposite sides of the extended inner chamber toward a front end of said pallet brake track assembly, a rear connecting rod transversely connected between rear ends of said mounting plates, a front connecting rod transversely connected between front ends of said mounting plates, a cylindrical brake drum rotatably connected between said mounting plates and located between said rear connecting rod and said front connecting rod, wherein said cylindrical brake drum includes a rubber contact surface, a front support member transversely connected between said first and second frame members, and at least one biasing member connected between said front connecting rod and said front support member.

4. Assembly of claim 3, wherein said cylindrical brake drum normally extends above said plurality of outer wheels, with reference to said first and second frame members.

5. Assembly of claim 3, wherein said front connecting rod is located above said front support member, and wherein said first and second biasing members define means for supporting said front connecting rod above said front support member.

6. Assembly of claim 3, wherein said front connecting rod is located below said front support member, and wherein said at least one biasing member defines a means for suspending said front connecting rod from said front support member.

7. Assembly of claim 6, wherein said plurality of outer axles includes, at least, a first axle connected to said first frame member, a second axle connected to said second frame member, a third axle connected to said first frame member, and a fourth axle connected to said second frame member, wherein said rear support rod and said first axle are coaxially connected together as a rigid, unitary construction, and wherein said front support member and said fourth axle are coaxially connected together as a rigid, unitary construction.

8. Assembly of claim 1, further comprising:

a plurality of rear axles transversely connected between said first and second frame members and located within the extended inner channel between the assembly rear end and said brake apparatus;

a plurality of rear wheels rotatably mounted on said plurality of rear axles;

a plurality of front axles transversely connected between said first and second frame members and located within the extended inner channel between the assembly front end and said brake apparatus; and a plurality of front wheels rotatably mounted on said plurality of front axles.

9. Assembly of claim 8, wherein each wheel of said plurality of rear wheels and said plurality of front wheels defines an equivalent common wheel diameter, wherein said plurality of rear axles are longitudinally displaced from each other by a distance which is less than the common wheel diameter, and wherein said plurality of front axles are longitudinally displaced from each other by a distance which is less than the common wheel diameter.

10. Assembly of claim 8, wherein each wheel of said plurality of rear wheels and said plurality of front wheels defines an equivalent common wheel diameter, and wherein at least one rear axle of said plurality of rear axles is displaced from at least one outer axle of said plurality of outer axles by a distance which is less than said common wheel diameter.

11. Assembly of claim 8, wherein said plurality of outer wheels, said plurality of rear wheels, and said plurality of front wheels are arranged to ensure that a pallet bottom board of a descending pallet is continuously in contact with at least three wheels of the pallet brake track assembly.

12. Assembly of claim 8, further comprising a plurality of rear cylindrical spacers and a plurality of front cylindrical spacers, wherein each of said plurality of rear cylindrical spacers is coaxially mounted on a rear axle of said plurality of rear axles, and each of said plurality of front cylindrical spacers is coaxially mounted on a front axle of said plurality of front axles, and wherein each of said plurality of rear cylindrical spacers and said plurality of front cylindrical spacers includes, at least, a means for maintaining an axial position of an adjacent wheel.

13. Assembly of claim 12, wherein each of said plurality of rear cylindrical spacers and said plurality of front cylindrical spacers further includes, at least, an axially extending slit means for snap-on assembly.

14. Assembly of claim 12, wherein said plurality of rear wheels and said plurality of rear cylindrical spacer are mounted on said plurality of rear axles in an alternating pattern from rear axle to successive rear axle defined by rear wheels alternating between one rear wheel being located on a rear axle equidistant between said first frame member and said second frame member and, alternately, two rear wheels being located on a rear axle so that one of the two rear wheels is adjacent to said first frame member and the other of the two rear wheels is adjacent to said second frame member, and wherein said plurality of front wheels and said plurality of front cylindrical spacers are mounted on said plurality of front axles in said alternating pattern from front axle to successive front axle defined by front wheels alternating between one front wheel being located on a front axle equidistant between said first frame member and said second frame member and, alternately, two front wheels being located on a front axle so that one of the two front wheels is adjacent to said first frame member and the other of the two front wheels is adjacent to said second frame member.

15. Assembly of claim 12, wherein said plurality of rear wheels and said plurality of rear cylindrical spacers are mounted on said plurality of rear axles in an alternating pattern from rear axle to successive rear axle defined by rear wheels alternating between being located adjacent to said first frame member and being located adjacent to said second frame member, and wherein said plurality of front wheels and said plurality of front cylindrical spacers are mounted on said plurality of front axles in an alternating pattern from front axle to successive front axle defined by front wheels alternating between being located adjacent to said first frame member and being located adjacent to said second frame member.

16. Assembly of claim 15, wherein only one rear wheel of said plurality of rear wheels and only one rear cylindrical spacer of said plurality of rear cylindrical spacers are mounted on each rear axle of said plurality of rear axles, and wherein only one front wheel of said plurality of front wheels and only one front cylindrical spacer of said plurality of front cylindrical spacers are mounted on each front axle of said plurality of front axles.

17. Assembly of claim 1, wherein said plurality of outer axles includes, at least, a first axle connected to said first frame member at a first longitudinal distance from the assembly rear end, a second axle connected to said second frame member at a second distance from the assembly rear end, a third axle connected to said first frame member at a third distance from the assembly rear end, a fourth axle connected to said second frame member at a fourth distance from the assembly rear end, a fifth axle connected to said first frame member at a fifth distance from the assembly rear end, and a sixth axle connected to said second frame member at a sixth distance from the assembly rear end, wherein said plurality of outer wheels includes, at least, a first wheel rotatably mounted on said first axle, a second wheel rotatably mounted on said second axle, a third wheel rotatably mounted on said third axle, a fourth wheel rotatably mounted on said fourth axle, a fifth wheel rotatably mounted on said fifth axle, and a sixth wheel rotatably mounted on said sixth axle, wherein said first distance is equivalent to said second distance, wherein said third distance is greater than said first distance, wherein said fourth distance is greater than said third distance, wherein said fifth distance is greater than said fourth distance, and wherein said sixth distance is equivalent to said fifth distance.

18. Assembly of claim 17, wherein each of said first, second, third, fourth, fifth, and sixth wheels defines an equivalent common wheel diameter, wherein said third axle and said fourth axle are longitudinally displaced from one another by a distance which is less than the common wheel diameter.

19. Assembly of claim 1, wherein each of said first and second frame members defines a relatively "L"-shaped cross-section with a lower leg extending transversely outward.

20. Assembly of claim 1, wherein said plurality of outer axles includes, at least, a first axle connected to said first frame member at a first longitudinal distance from the assembly rear end, a second axle connected to said second frame member at a second distance from the assembly rear end, a third axle connected to said first frame member at a third distance from the assembly rear end, and a fourth axle connected to said second frame member at a fourth distance from the assembly rear end, wherein said plurality of outer wheels includes, at least, a first wheel rotatably mounted on said first axle, a second wheel rotatably mounted on said second axle, a third wheel rotatably mounted on said third axle, and a fourth wheel rotatably mounted on said fourth axle, wherein the second distance is greater than the first distance, wherein the third distance is greater than the second distance, and wherein the fourth distance is greater than the third distance.

21. Assembly of claim 20, wherein each of said first, second, third, and fourth wheels defines an equivalent common wheel diameter, wherein said first axle and said second axle are longitudinally displaced from one another by a distance which is less than the common wheel diameter, and wherein said second axle and said third axle are longitudinally displaced from one another by a distance which is less than the common wheel diameter.

22. Pallet brake track assembly for use in an inclined pallet flow system to maintain slow movement of descending loaded pallets, said pallet brake track assembly having an assembly rear end which first encounters a descending loaded pallet and an assembly front end which last encounters the descending loaded pallet, said pallet brake track assembly comprising:

a first frame member extending longitudinally between an assembly rear end and an assembly front end;

a second frame member extending longitudinally between the assembly rear end and the assembly front end and extending parallel to said first frame member, thereby defining an extended inner channel between said first and second frame members;

a brake apparatus located at least partially within the extended inner channel, said brake apparatus including, at least, a support assembly connected between said first frame member and said second frame member, and a cylindrical brake drum rotatably connected to said support assembly;

a plurality of rear axles transversely connected between said first and second frame members and located within the extended inner channel between the assembly rear end and said brake apparatus;

a plurality of rear wheels rotatably mounted on said plurality of rear axles;

a plurality of rear cylindrical spacers coaxially mounted on said plurality of rear axles;

a plurality of front axles transversely connected between said first and second frame members and located within the extended inner channel between the assembly front end and said brake apparatus;

a plurality of front wheels rotatably mounted on said plurality of front axles;

a plurality of front cylindrical spacers coaxially mounted on said plurality of front axles;

a first wheel assembly located adjacent to said brake apparatus and including, at least, a first axle perpendicularly connected to said first frame member and extending outward and away from the extended inner channel, a first wheel rotatably mounted on said first axle at a location outside the extended inner channel, and a first cylindrical spacer means coaxially mounted on said first axle for maintaining an axial position of said first wheel;

a second wheel assembly located adjacent to said brake apparatus and including, at least, a second axle perpendicularly connected to said second frame member and extending outward and away from the extended inner channel, and a second wheel rotatably mounted on said second axle at a location outside the extended inner channel, and a second cylindrical spacer means coaxially mounted on said second axle for maintaining an axial position of said second wheel;

a third wheel assembly located adjacent to said brake apparatus and including, at least, a third axle perpendicularly connected to said first frame member and extending outward and away from the extended inner channel, a third wheel rotatably mounted on said third axle at a location outside the extended inner channel, and a third cylindrical spacer means coaxially mounted on said third axle for maintaining an axial position of said third wheel; and a fourth wheel assembly located adjacent to said brake apparatus and including, at least, a fourth axle perpendicularly connected to said second frame member and extending outward and away from the extended inner channel, a fourth wheel rotatably mounted on said fourth axle at a location outside the extended inner channel, and a fourth cylindrical spacer means coaxially mounted on said fourth axle for maintaining an axial position of said fourth wheel.

23. Assembly of claim 22, wherein said plurality of rear wheels and said plurality of rear cylindrical spacers are mounted on said plurality of rear axles in an alternating pattern from rear axle to successive rear axle defined by rear wheels alternating between being located adjacent to said first frame member and being located adjacent to said second frame member, and wherein said plurality of front wheels and said plurality of front cylindrical spacers are mounted on said plurality of front axles in an alternating pattern from front axle to successive front axle defined by front wheels alternating between being located adjacent to said first frame member and being located adjacent to said second frame member.

24. Assembly of claim 22, wherein said first, second, third, and fourth wheels are located at first, second, third, and fourth longitudinal distances, respectfully, from a rear end of said pallet brake track assembly, wherein the second distance is greater than the first distance, wherein the third distance is greater than the second distance, and wherein the fourth distance is greater than the third distance.

25. Assembly of claim 22, further comprising:

a fifth wheel assembly located adjacent to said brake apparatus and including, at least,
  a fifth axle perpendicularly connected to said first frame member and extending outward and away from the extended inner channel,
  a fifth wheel rotatably mounted on said fifth axle at a location outside the extended inner channel, and
  a fifth cylindrical spacer means coaxially mounted on said fifth axle for maintaining an axial position of said fifth wheel; and
a sixth wheel assembly located adjacent to said brake apparatus and including, at least,
  a sixth axle perpendicularly connected to said second frame member and extending outward and away from the extended inner channel,
  a sixth wheel rotatably mounted on said sixth axle at a location outside the extended inner channel, and
  a sixth cylindrical spacer means coaxially mounted on said sixth axle for maintaining an axial position of said sixth wheel.

26. Assembly of claim 25, wherein said plurality of rear wheels and said plurality of rear cylindrical spacers are mounted on said plurality of rear axles in an alternating pattern from rear axle to successive rear axle defined by rear wheels alternating between one rear wheel being located on a rear axle equidistant between said first frame member and said second frame member and, alternately, two rear wheels being located on a rear axle so that one of the two rear wheels is adjacent to said first frame member and the other of the two rear wheels is adjacent to said second frame member, and wherein said plurality of front wheels and said plurality of front cylindrical spacers are mounted on said plurality of front axles in an alternating pattern from front axle to successive front axle defined by front wheels alternating between one front wheel being located on a front axle equidistant between said first frame member and said second frame member and, alternately, two front wheels being located on a front axle so that one of the two front wheels is adjacent to said first frame member and the other of the two front wheels is adjacent to said second frame member.

27. Assembly of claim 25, wherein said first, second, third, fourth, fifth, and sixth wheels are located at first, second, third, fourth, fifth, and sixth longitudinal distances, respectfully, from a rear end of said pallet brake track assembly,
  wherein said first distance is equivalent to said second distance,
  wherein said third distance is greater than said first distance,
  wherein said fourth distance is greater than said third distance,
  wherein said fifth distance is greater than said fourth distance, and
  wherein said sixth distance is equivalent to said fifth distance.

28. Pallet brake track assembly for use in an inclined pallet flow system to maintain slow movement of descending loaded pallets, said pallet brake track assembly having an assembly rear end which first encounters a descending loaded pallet and an assembly front end which last encounters the descending loaded pallet, said pallet brake track assembly comprising:
  first and second frame members extending longitudinally in parallel between an assembly rear end and an assembly front end to define an extended inner channel;
  a plurality of inner axles transversely connected between said first and second frame members and located within the extended inner channel;
  a plurality of inner wheels rotatably mounted on said plurality of inner axles, wherein each inner wheel of said plurality of inner wheels defines a common wheel diameter; and
  a plurality of inner cylindrical spacers coaxially mounted on said plurality of inner axles, wherein each of said plurality of inner cylindrical spacers includes, at least, an axially extending slit means for snap-on assembly, and wherein said plurality of inner wheels and said plurality of inner cylindrical spacers are mounted on said plurality of inner axles in an alternating pattern from inner axle to successive inner axle defined by inner wheels alternating between one inner wheel being located on an inner axle equidistant between said first frame member and said second frame member and, alternately, two inner wheels being located on an inner axle so that one of the two inner wheels is adjacent to said first frame member and the other of the two inner wheels is adjacent to said second frame member,
wherein said plurality of inner axles are longitudinally displaced from each other by a distance which is less than the common wheel diameter.

29. Pallet brake assembly for use in an inclined pallet flow system to maintain slow movement of descending loaded pallets, said pallet brake track assembly having an assembly rear end which first encounters a descending loaded pallet and an assembly front end which last encounters the descending loaded pallet, said pallet brake track assembly comprising:
  first and second frame members extending longitudinally in parallel between an assembly rear end and an assembly front end to define an extended inner channel;
  a plurality of inner axles transversely connected between said first and second frame members and located within the extended inner channel;
  a plurality of inner wheels rotatably mounted on said plurality of inner axles;
  a plurality of inner cylindrical spacers coaxially mounted on said plurality of inner axles, wherein each of said plurality of inner cylindrical spacers includes, at least, an axially extending slit means for snap-on assembly;
  a plurality of brake apparatuses located at least partially within the extended inner channel;
  a plurality of outer axles perpendicularly connected to said first frame member near said pluralities of brake apparatuses and extending outward and away from the extended inner channel; and
  a plurality of outer wheels rotatably mounted on said plurality of outer axles at locations outside the extended inner channel.

30. Pallet brake track assembly for use in an inclined pallet flow system to maintain slow movement of descending loaded pallets, said pallet brake track assembly having an assembly rear end which first encounters a descending loaded pallet and an assembly front end which last encounters the descending loaded pallet, said pallet brake track assembly comprising;
  first and second frame members extending longitudinally in parallel between an assembly rear end and an assembly front end to define an extended inner channel;

a plurality of inner axles transversely connected between said first and second frame members and located within the extended inner channel;

a plurality of inner wheels rotatably mounted on said plurality of inner axles, wherein each inner wheel of said plurality of inner wheels defines an equivalent common wheel diameter; and a plurality of inner cylindrical spacers coaxially mounted on said plurality of inner axles, wherein each of said plurality of inner cylindrical spacers includes, at least, an axially extending slit means for snap-on assembly, and wherein said plurality of inner wheels and said plurality of inner cylindrical spacers are mounted on said plurality of inner axles in an alternating pattern from inner axle to successive inner axle defined by inner wheels alternating between being located adjacent to said first frame member and being located adjacent to said second frame member, wherein said plurality of inner axles are longitudinally displaced from each other by a distance which is less than the common wheel diameter.

31. Pallet brake track assembly for use in an inclined pallet flow system to maintain slow movement of descending loaded pallets, said pallet brake track assembly having an assembly rear end which first encounters a descending loaded pallet and an assembly front end which last encounters the descending loaded pallet, said pallet brake track assembly comprising:

a first frame member extending longitudinally between an assembly rear end and an assembly front end;

a second frame member extending longitudinally between the assembly rear end and the assembly front end and extending parallel to said first frame member, thereby defining an extended inner channel between said first and second frame members;

a brake apparatus located at least partially within the extended inner channel;

a plurality of outer axles connected to at least one of said first frame member and said second frame member adjacent said brake apparatus, wherein each outer axle of said plurality of outer axles extends outward and away from the extended inner channel;

a plurality of outer wheels rotatably mounted on said plurality of outer axles at locations outside the extended inner channel;

a plurality of rear axles transversely connected between said first and second frame members and located within the extended inner channel between the assembly rear end and said brake apparatus;

a plurality of rear wheel rotatably mounted on said plurality of rear axles; and a plurality of front axles transversely connected between said first and second frame members and located within the extended inner channel between the assembly front end and said brake apparatus;

a plurality of front wheels rotatably mounted on said plurality of front axles, wherein each wheel of said plurality of rear wheels and said plurality of front wheels defines an equivalent common wheel diameter, wherein said plurality of rear axles are longitudinally displaced from each other by a distance which is less than the common wheel diameter, and wherein said plurality of front axles are longitudinally displaced from each other by a distance which is less than the common wheel diameter.

32. Assembly of claim 31, wherein each wheel of said plurality of rear wheels and said plurality of front wheels defines an equivalent common wheel diameter, and wherein at least one rear axle of said plurality of rear axles is displaced from at least one outer axle of said plurality of outer axles by a distance which is less than said common wheel diameter.

33. Assembly of claim 31, further comprising a plurality of rear cylindrical spacers and a plurality of front cylindrical spacers, wherein each rear cylindrical spacer of said plurality of rear cylindrical spacers is coaxially mounted on a rear axle of said plurality of rear axles, wherein each front cylindrical spacer of said plurality of front cylindrical spacers is coaxially mounted on a front axle of said plurality of front axles, wherein each of cylindrical spacer of said plurality of rear cylindrical spacers and said plurality of front cylindrical spacers includes, at least, a means for maintaining an axial position of an adjacent wheel, wherein said plurality of rear wheels and said plurality of rear cylindrical spacer are mounted on said plurality of rear axles in an alternating pattern from rear axle to successive rear axle defined by rear wheels alternating between one rear wheel being located on a rear axle equidistant between said first frame member and said second frame member and, alternately, two rear wheels being located on a rear axle so that one of the two rear wheels is adjacent to said first frame member and the other of the two rear wheels is adjacent to said second frame member, and wherein said plurality of front wheels and said plurality of front cylindrical spacers are mounted on said plurality of front axles in an alternating pattern from front axle to successive front axle defined by front wheels alternating between one front wheel being located on a front axle equidistant between said first frame member and said second frame member and, alternately, two front wheels being located on a front axle so that one of the two front wheels is adjacent to said first frame member and the other of the two front wheels is adjacent to said second frame member.

34. Pallet brake track assembly for use in an inclined pallet flow system to maintain slow movement of descending loaded pallets, said pallet brake track assembly having an assembly rear end which first encounters a descending loaded pallet and an assembly front end which last encounters the descending loaded pallet, said pallet brake track assembly comprising:

a first frame member extending longitudinally between an assembly rear end and an assembly front end;

a second frame member extending longitudinally between the assembly rear end and the assembly front end and extending parallel to said first frame member, thereby defining an extended inner channel between said first and second frame members;

a brake apparatus located at least partially within the extended inner channel;

a plurality of outer axles connected to at least one of said first frame member and said second frame member adjacent said brake apparatus, wherein each outer axle of said plurality of outer axles extends outward and away from the extended inner channel, wherein said plurality of outer axles includes, at least,
  a first axle connected to said first frame member at a first longitudinal distance from the assembly rear end,
  a second axle connected to said second frame member at a second distance from the assembly rear end,
  a third axle connected to said first frame member at a third distance from the assembly rear end,
  a fourth axle connected to said second frame member at a fourth distance from the assembly rear end,
  a fifth axle connected to said first frame member at a fifth distance from the assembly rear end, and
  a sixth axle connected to said second frame member at a sixth distance from the assembly rear end,
wherein said first distance is equivalent to said second distance,
wherein said third distance is greater than said first distance,
wherein said fourth distance is greater than said third distance,
wherein said fifth distance is greater than said fourth distance, and
wherein said sixth distance is equivalent to said fifth distance; and
  a plurality of outer wheels rotatably mounted on said plurality of outer axles at locations outside the extended inner channel, wherein said plurality of outer wheels includes, at least,
    a first wheel rotatably mounted on said first axle,
    a second wheel rotatably mounted on said second axle,
    a third wheel rotatably mounted on said third axle,
    a fourth wheel rotatably mounted on said fourth axle,
    a fifth wheel rotatably mounted on said fifth axle, and
    a sixth wheel rotatably mounted on said sixth axle.

35. Assembly of claim 34, wherein each of said first, second, third, fourth, fifth, and sixth wheels defines an equivalent common wheel diameter, wherein said third axle and said fourth axle are longitudinally displaced from one another by a distance which is less than the common wheel diameter.

36. Pallet brake track assembly for use in an inclined pallet flow system to maintain slow movement of descending loaded pallets, said pallet brake track assembly having an assembly rear end which first encounters a descending loaded pallet and an assembly front end which last encounters the descending loaded pallet, said pallet brake track assembly comprising:
  first and second frame members extending longitudinally in parallel between an assembly rear end and an assembly front end to define an extended inner channel;
  a plurality of inner axles transversely connected between said first and second frame members and located within the extended inner channel; and
  a plurality of inner wheels rotatably mounted on said plurality of inner axles,
  wherein each inner wheel of said plurality of inner wheels defines a common wheel diameter,
  wherein said plurality of inner axles are longitudinally displaced from each other by a distance which is less than the common wheel diameter, and
  wherein said plurality of inner wheels are mounted on said plurality of inner axles in an alternating pattern from inner axle to successive inner axle defined by inner wheels alternating between one inner wheel being located on an inner axle equidistant between said first frame member and said second frame member and, alternately, two inner wheels being located on an inner axle so that one of the two inner wheels is adjacent to said first frame member and the other of the two inner wheels is adjacent to said second frame member.

37. Assembly of claim 36, further comprising:
  a plurality of brake apparatuses located at least partially within the extended inner channel;
  a plurality of outer axles perpendicularly connected to said first frame member near said pluralities of brake apparatuses and extending outward and away from the extended inner channel; and
  a plurality of outer wheels rotatably mounted on said plurality of outer axles at locations outside the extended inner channel.

38. An inclined pallet flow system for moving pallets slowly and consistently, said pallet assembly comprising:
  a first side track assembly including, at least,
    a plurality of first side track wheels, and
    a first side frame means for supporting said plurality of first side track wheels;
  a second side track assembly extending parallel to said first side track assembly and including, at least,
    a plurality of second side track wheels, and
    a second side frame means for supporting said plurality of second side track wheels; and
  a center track assembly extending parallel to, and located between, said first side track assembly and said second side track assembly and including, at least,
    a first frame member,
    a second frame member extending parallel to said first frame member to define an extended inner channel between said first frame member and said second frame members,
    a brake apparatus located at least partially within the extended inner channel,
    a plurality of outer axles connected to at least one of said first frame member and said second frame member adjacent said brake apparatus, wherein each outer axle of said plurality of outer axles extends outward and away from the extended inner channel, and
    a plurality of outer wheels rotatably mounted on said plurality of outer axles at locations outside the extended inner channel.

39. System of claim 38, wherein said center track assembly further includes, at least,
  a plurality of inner axles transversely connected between said first frame member and said second frame member, and
  a plurality of inner wheels rotatably mounted on said plurality of inner axles.

* * * * *